Sept. 2, 1924.  E. WISNIEWSKI ET AL  1,507,447
CAMERA
Filed Nov. 29, 1921
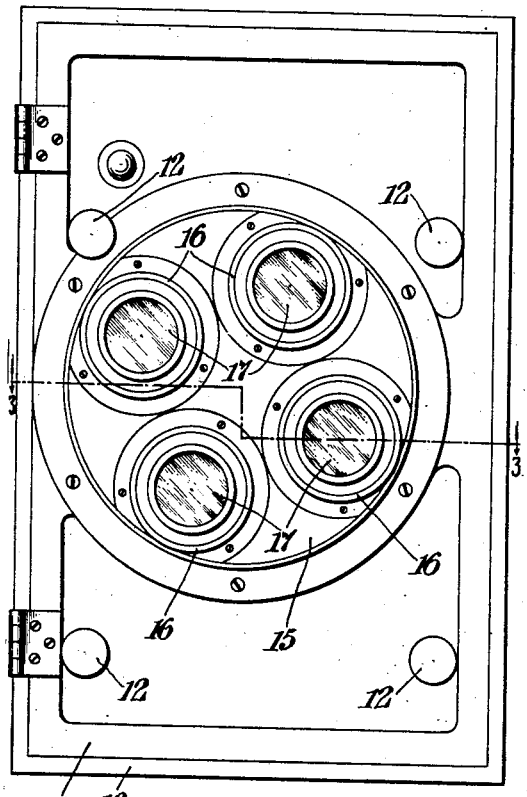
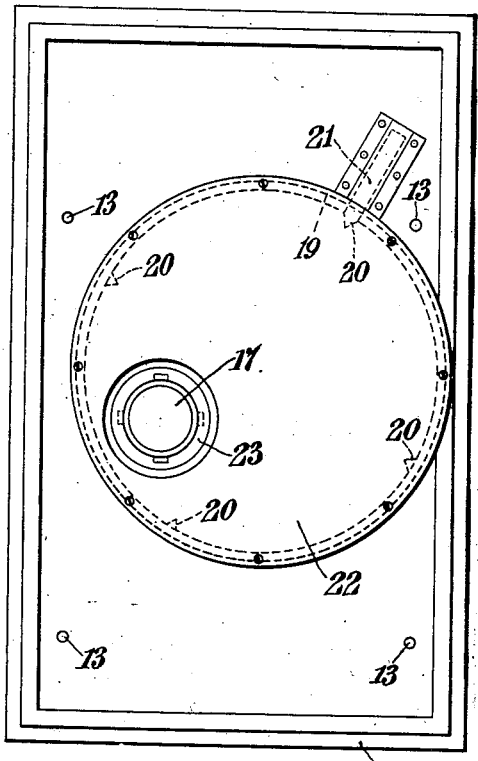
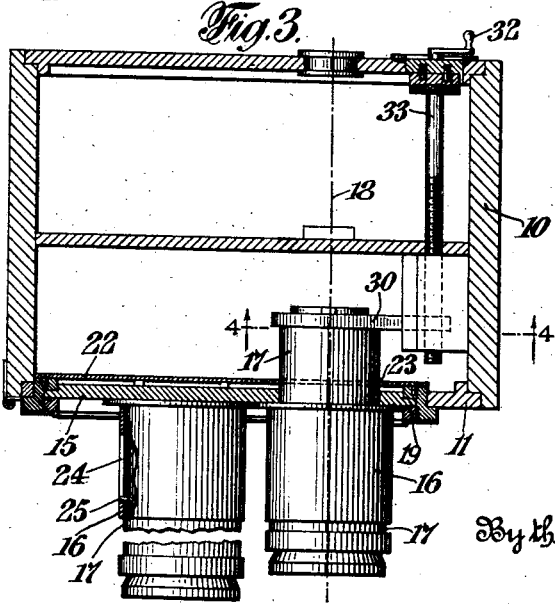
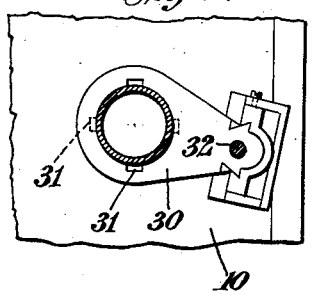
Inventors
Edmund Wisniewski
Anton Stöger
By their Attorney Patented Sept. 2, 1924.

1,507,447

UNITED STATES PATENT OFFICE.

EDMUND WISNIEWSKI, OF NEW YORK, AND ANTON STÖGER, OF LONG ISLAND CITY, NEW YORK.

CAMERA.

Application filed November 29, 1921. Serial No. 518,559.

*To all whom it may concern:*

Be it known that we, EDMUND WISNIEWSKI and ANTON STÖGER, citizens of the United States and Austria, respectively, residents of New York and Long Island City, respectively, in the counties of New York and Queens, respectively, and State of New York, have invented certain new and useful Improvements in Cameras, of which the following is a specification.

The invention relates to photographic apparatus in which there is employed a plurality of lenses mounted upon a turret which may be rotated to successively bring the various lenses into the optical axis of the apparatus. It has for its object, in apparatus of this character, to provide means for positively holding a lens in its active position and for so mounting same in the carrying turret and connecting it with the focusing mechanism provided that the operation of focusing may be accomplished from the rear of the apparatus. A further object of the invention consists in the provision of holding means which do not act upon the bearing surface of the turret.

The nature of the invention, however, will best be understood when described in connection with the accompanying drawings, in which—

Fig. 1 is a front elevation of the photographic apparatus.

Fig. 2 is an elevation of the inside of the door carrying the turret and lenses.

Fig. 3 is a horizontal section taken on the line 3—3, Fig. 1, looking in the direction of the arrows.

Fig. 4 is a fragmentary vertical section taken on the line 4—4, Fig. 3, looking in the direction of the arrows.

Similar characters of reference designate corresponding parts thruout the several views.

Referring to the drawings, 10 designates a suitable cabinet or box and to the front of which is hinged a door 11, or the like, which may be fixedly secured to the cabinet thru locking screws 12 projecting outside of the door and fitting studs 13 provided therefor within the cabinet. Mounted within this door is a turret member consisting of a rotatable disk 15 to which is attached a plurality of sleeves 16 adapted to receive the respective lenses 17 which are to be brought into the optical axis 18 of the apparatus thru the rotation of the disk 15. The latter is provided with an off-set or flange 19 having a plurality of equidistantly spaced notches 20 corresponding in number to the number of lens holders or sleeves 16 of the turret disk; and a spring-pressed detent 21, carried by the door, is designed to drop therein to hold the rotatable disk 15 in the proper position for locking the particular lens in the optical axis 18. The holding means for the turret plate then does not contact with its bearing surface and obviates damage to same thereby.

A cover 22, upon the inner side of the door, closes off the entire space occupied by the turret and is provided with a single opening 23 whose axis lies in the optical axis 18, said opening being designed to permit of movement therethru of a lens 17 for the purpose hereinafter set forth. The lenses 17 are mounted in their respective sleeves 16 in manner to allow of a limited reciprocation therein, as in providing a slot 24 in a said sleeve and securing a screw or pin 25 in the corresponding lens barrel, said pin or screw projecting into the said slot. The length and width of this slot are designed to allow the lens to project inwardly beyond the cover plate sufficiently to effect engagement with an extension of the focusing mechanism, the same being in the nature of laterally extending arm 30; and to turn sufficiently to lock therein, as thru a bayonet connection 31. The particular lens then becomes a fixed portion of the focusing mechanism and may be reciprocated in the optical axis 18 in the usual manner, as in rotating a handle or wheel 32 located preferably at the back of the apparatus. The rotation of this handle rotates a focusing stem 33, in threaded engagement with the inner end of arm 30, to thereby impart reciprocation to said arm and its attached lens.

In this manner, though the various lenses are individually separable from the focusing mechanism, yet they may conveniently be secured thereto to become an integral part thereof thru the substantial and rugged connection between same. It will be appreciated, also, that in the operative position, shown in Fig. 3, there is no possibility of the particular lens being displaced from its position in the optical axis, as not only is the turret held by the detent but the lens itself is fixed thru its connection with the focusing mechanism. The disengagement of the lens, moreover, is conveniently effected merely by rotating same to disengage the bayonet joint and then pulling outwardly until limited by the pin 25. The turret may then be rotated freely to bring another lens into position, if desired.

We claim:—

1. A camera having a rotatable turret plate and a plurality of lenses mounted therein, and focusing mechanism located at the rear of the camera and adapted to engage a selected one of said lenses.

2. In a camera having a rotatable turret plate and a plurality of lenses mounted therein, and separate focusing mechanism: means to secure a selected one of said lenses to the focusing mechanism to operate therewith.

3. In a camera having a rotatable turret plate and a plurality of lenses mounted therein, and separate focusing mechanism: means to secure a selected one of said lenses to the focusing mechanism, after it has been moved into the optical axis of the camera, to allow of focusing by the said mechanism.

4. In a camera having a rotatable turret plate and a plurality of lenses mounted therein and capable of a limited reciprocation in said plate, and separate focusing mechanism: means, when a selected one of said lenses has been moved inwardly a predetermined amount, to lock same to the said focusing mechanism to operate therewith.

5. In a camera: a rotatable turret plate having a plurality of sleeves, each provided with a longitudinal slot, and lenses mounted in the respective sleeves and each having a pin fitting the corresponding slot of its sleeve; a back plate for the turret and having an opening in the optical axis of the camera to permit a selected one of said lenses to extend therethru into the camera; and focusing mechanism adapted to be secured to said inwardly projecting lens to reciprocate same for proper focusing.

6. In a camera: a bearing member, a rotatable turret plate having its circumference fitting within the bearing member and having an offset portion provided with a plurality of equidistantly spaced notches, corresponding in number to the number of lenses carried by the turret plate, and a spring pressed detent to engage a notch to hold the turret plate against rotation.

Signed at Long Island City, N. Y., in the county of Queens and State of New York this 23d day of November A. D. 1921.

EDMUND WISNIEWSKI.
ANTON STÖGER.